US010384806B2

(12) United States Patent
Bertin

(10) Patent No.: US 10,384,806 B2
(45) Date of Patent: Aug. 20, 2019

(54) LIGHTING SYSTEM FOR AIRCRAFT LANDING SURFACES AND METHOD FOR MAKING SAID SYSTEM

(71) Applicant: CALZONI S.r.l., Calderara di Reno (Bologna) (IT)

(72) Inventor: Daniele Maria Bertin, Milan (IT)

(73) Assignee: CALZONI S.R.L., Calderara di Reno (IT)

( * ) Notice: Subject to any disclaimer, the term of this patent is extended or adjusted under 35 U.S.C. 154(b) by 130 days.

(21) Appl. No.: 15/024,244

(22) PCT Filed: Oct. 16, 2014

(86) PCT No.: PCT/IB2014/065356
§ 371 (c)(1),
(2) Date: Mar. 23, 2016

(87) PCT Pub. No.: WO2015/056200
PCT Pub. Date: Apr. 23, 2015

(65) Prior Publication Data
US 2016/0251089 A1    Sep. 1, 2016

(30) Foreign Application Priority Data

Oct. 17, 2013  (IT) .............................. BO2013A0569

(51) Int. Cl.
*B64F 1/20*     (2006.01)
*F21V 31/04*    (2006.01)
(Continued)

(52) U.S. Cl.
CPC ................ *B64F 1/20* (2013.01); *F21S 8/032* (2013.01); *F21V 23/001* (2013.01);
(Continued)

(58) Field of Classification Search
CPC .............. F21Y 2115/10; F21Y 2101/00; F21V 23/001; F21V 31/005; F21V 31/04;
(Continued)

(56) References Cited

U.S. PATENT DOCUMENTS 4,343,033 A * 8/1982 Suzuki ...................... B64F 1/20
362/145
4,382,274 A * 5/1983 De Backer ................ B64F 1/20
340/815.76
(Continued)

FOREIGN PATENT DOCUMENTS

EP    0648898 A1 *  4/1995  ................ B64F 1/18

OTHER PUBLICATIONS

Machine Translation of EP 0648898 A1.*
International Search Report and Written Opinion dated Jan. 20, 2015 for counterpart PCT application No. PCT/IB2014/065356.

*Primary Examiner* — Sean P Gramling
*Assistant Examiner* — Keith G. Delahoussaye
(74) *Attorney, Agent, or Firm* — Shuttleworth & Ingersoll, PLLC; Timothy J. Klima

(57) ABSTRACT

A lighting system for aircraft landing surfaces, including a plurality of electric lighting elements arranged in an orderly sequence to help to form on the surface a predetermined symbol, visible from the aircraft during landing, at least one branch box for accessing the electricity network, the sequence of the lighting elements forming a chain.

13 Claims, 3 Drawing Sheets

(51) Int. Cl.
  *F21S 8/00*   (2006.01)
  *F21V 23/00*  (2015.01)
  *F21V 31/00*  (2006.01)
  *F21S 2/00*   (2016.01)
  *F21W 111/06* (2006.01)
  *F21Y 115/10* (2016.01)
  *F21Y 101/00* (2016.01)

(52) U.S. Cl.
  CPC ............ F21V 31/005 (2013.01); F21V 31/04 (2013.01); *B64D 2203/00* (2013.01); *F21S 2/00* (2013.01); *F21W 2111/06* (2013.01); *F21Y 2101/00* (2013.01); *F21Y 2115/10* (2016.08)

(58) Field of Classification Search
  CPC .... F21S 2/00; F21S 8/032; F21S 4/20; F21W 2111/06; B64F 1/20; B64F 1/007; B64D 2203/00
  USPC .................................. 362/153.1, 311.01, 455
  See application file for complete search history.

(56) References Cited

U.S. PATENT DOCUMENTS

| | | | |
|---|---|---|---|
| 4,834,321 A | | 5/1989 | Granger |
| 5,559,510 A | | 9/1996 | Strong, III et al. |
| 5,669,691 A | * | 9/1997 | Barrow .................. B64F 1/205 |
| | | | 362/153.1 |
| 5,823,655 A | * | 10/1998 | Brooks .................. F21V 23/06 |
| | | | 362/145 |
| 6,648,498 B1 | * | 11/2003 | Tsao ........................ F21V 15/01 |
| | | | 315/185 R |
| 7,832,896 B2 | * | 11/2010 | Saha .................. G09F 13/0409 |
| | | | 362/240 |
| 2008/0220549 A1 | * | 9/2008 | Nall ........................ H05K 3/284 |
| | | | 438/26 |
| 2011/0249430 A1 | * | 10/2011 | Stamatatos .......... B60Q 1/2615 |
| | | | 362/184 |
| 2013/0188357 A1 | * | 7/2013 | Sloan .................. G09F 13/0404 |
| | | | 362/249.01 |

\* cited by examiner

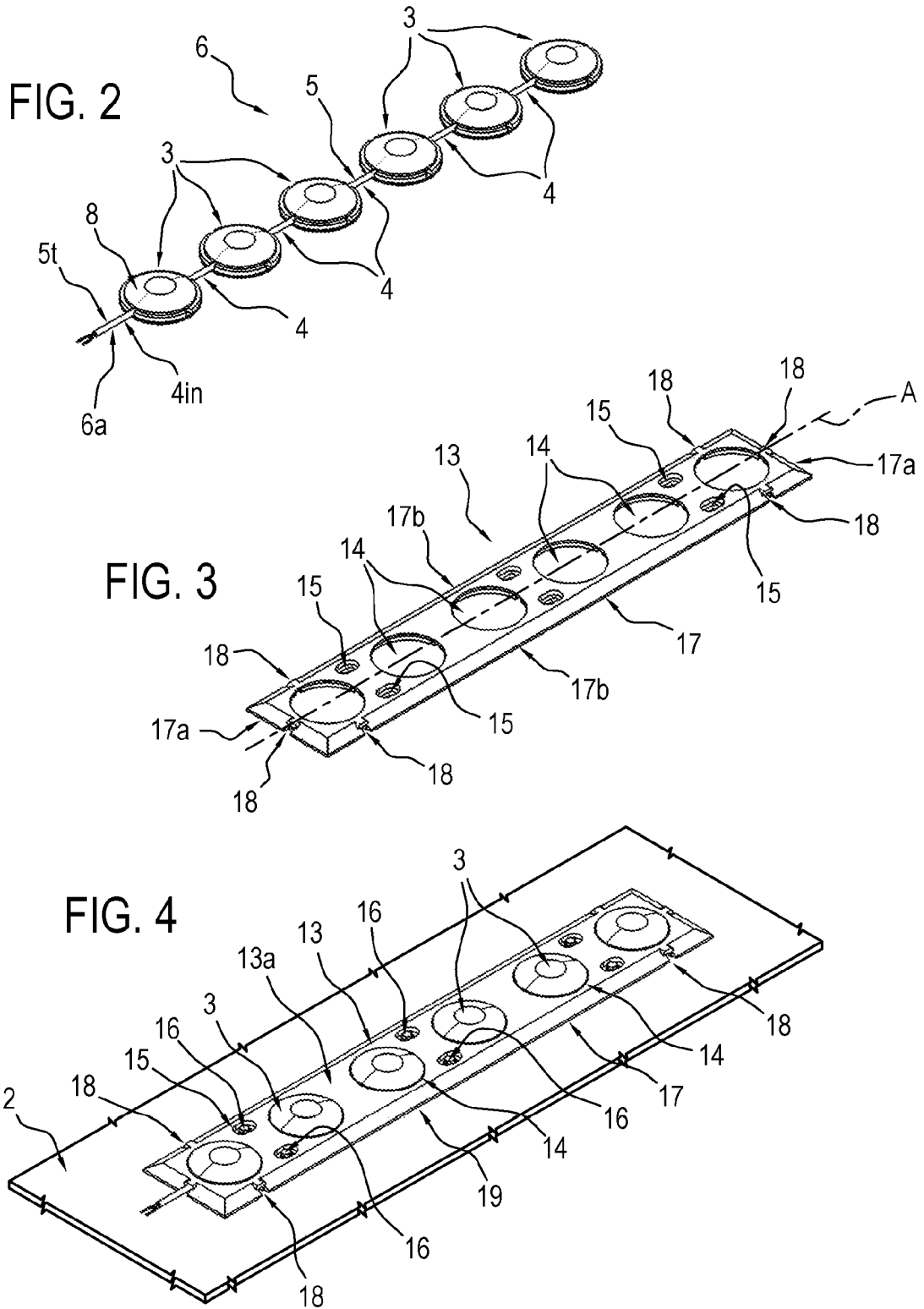

LIGHTING SYSTEM FOR AIRCRAFT LANDING SURFACES AND METHOD FOR MAKING SAID SYSTEM

This application is the National Phase of International Application PCT/IB2014/065356 filed Oct. 16, 2014 which designated the U.S. and that International Application was published under PCT Article 21(2) in English.

This application claims priority to Italian Patent Application No. BO2013A000569 filed Oct. 17, 2013, which application is incorporated by reference herein.

TECHNICAL FIELD

This invention relates to a lighting system for aircraft landing surfaces.

More specifically, the system according to this invention is applicable in particular to aircraft landing surfaces made on offshore oil platforms or the like.

The invention also relates to a method for making a lighting system for aircraft landing surfaces.

BACKGROUND ART

Offshore platforms, which are very often made in environments with extreme climatic conditions, have a surface for the landing and take-off of aircraft, generally helicopters.

Helicopters are used for almost all the transfers, both of freight and personnel.

The above-mentioned surfaces generally consist of a metallic plane, normally made of steel or aluminum, supported by the platform structure by means of suitable frameworks.

Surfaces of this type are also made on vessels such as, for example, container ships or tankers or even on smaller sized merchant ships.

These surfaces located on a floating or fixed offshore structure are also known as helidecks.

In order to make the precise localisation of the landing point easy for the pilot of the aircraft, and in accordance with international standards, specific identification symbols must be shown on the above-mentioned surface, such as, for example for the helidecks, a large capital letter H (from the word Helicopter) and a circle inside which the above-mentioned H is centred.

In the majority of cases, the landing surfaces are painted green whilst the symbol H is white and the circle is yellow.

So that the above-mentioned surfaces can also be used for night-time landings, the identification symbols present must be illuminated.

The making of a lighting system which is able to render the above-mentioned identification symbols visible has numerous problems and disadvantages.

A first problem is due to the fact that the surfaces on which the system must be installed are, as mentioned, made of metal material, either steel or aluminum, and it is therefore not possible to make tracks or channels in which to fit the luminous devices and the relative power supply lines.

This circumstance means that the lighting devices must be made very thin so that they can be rested on and protrude from the surfaces.

Modular systems have therefore been made consisting of plates with a longitudinal extension containing lighting elements positioned in line, the plates being then connected to each other by suitable electrical connections.

These connections are, however, the source of problems since, for example, for installations on oil platforms it is necessary to comply with explosion-resistant regulations which involve solutions, in general rather expensive and complex, to guarantee the absence of sparks. More specifically, the casings and the connections are both complex and costly to make.

Moreover, in order to guarantee compliance with the regulations, the above-mentioned connections are necessarily bulky, thus constituting an undesired volume projecting from the landing surface.

Document EP 648 898 teaches the making of lighting systems comprising a sequence of base elements encapsulating inside a plurality of electroluminescent sources, with the sources stably fixed to the respective base element. This connection renders the system not particularly versatile in its embodiment as well as decidedly not very practical with regard to its maintenance in the event of faults.

DISCLOSURE OF THE INVENTION

The aim of this invention is to provide a lighting system for aircraft landing surfaces which overcomes the above-mentioned disadvantages and problems of the prior art.

More specifically, the aim of this invention is to provide a lighting system for aircraft landing surfaces which is simple to install and easy to use.

These and other aims are substantially achieved by a lighting system for aircraft landing surfaces comprising technical features as disclosed herein.

BRIEF DESCRIPTION OF THE DRAWINGS

Further features and advantages of the invention are more apparent in the non-limiting description which follows of a preferred non-limiting embodiment of a lighting system for aircraft landing surfaces illustrated in the accompanying drawings, in which:

FIG. 2 is a perspective view from above of a detail of the system of FIG. 1;

FIG. 3 is a perspective view from above of another detail of the system of FIG. 1;

FIG. 4 is a perspective view from above of the details of FIGS. 2 and 3 in their assembled configuration;

DETAILED DESCRIPTION OF PREFERRED EMBODIMENTS OF THE INVENTION

Figure 1:
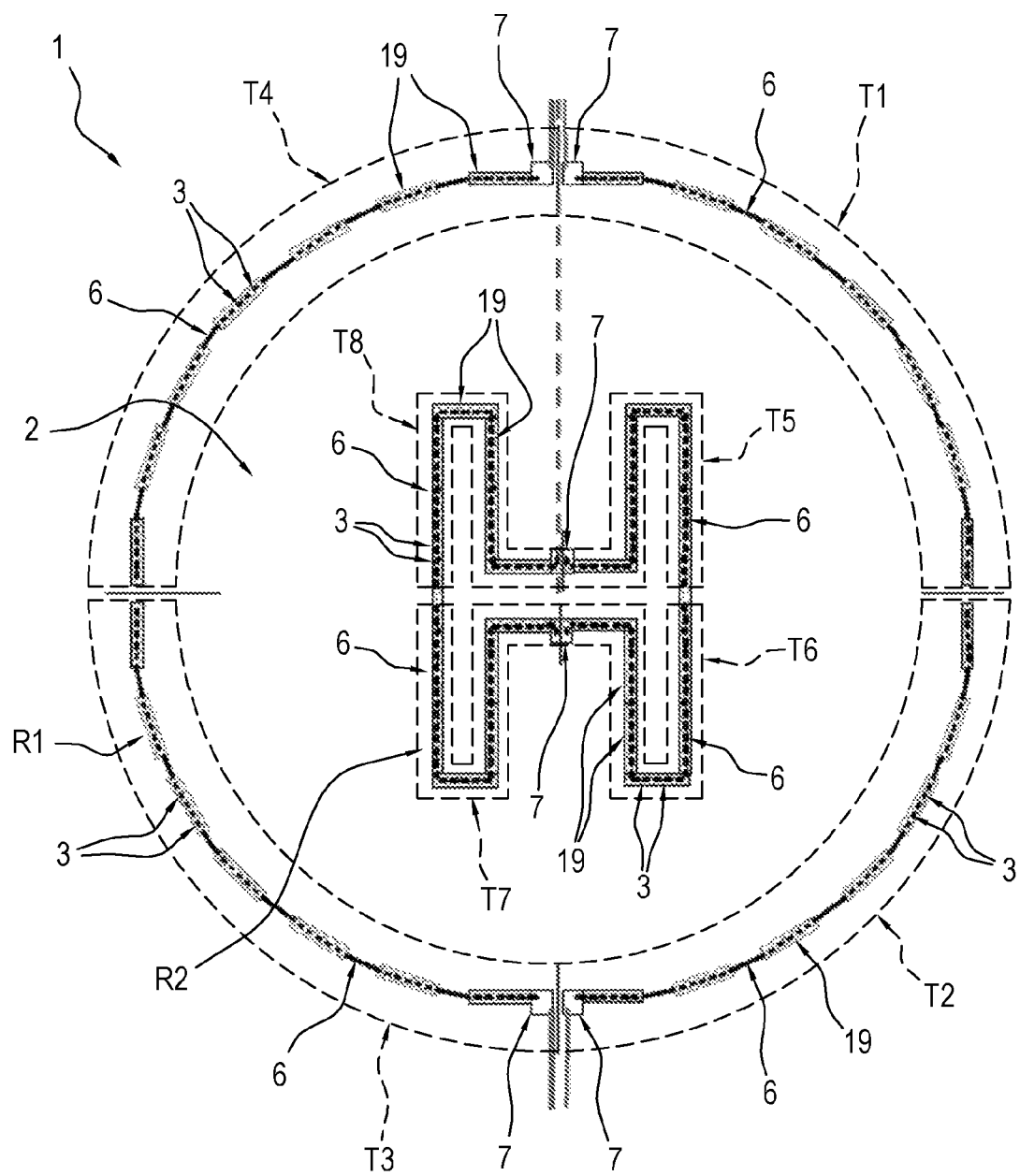
FIG. 1 is a schematic top plan view, a lighting system for aircraft landing surfaces made in accordance with this invention.

With reference to FIG. 1, the numeral 1 denotes in its entirety a lighting system for an aircraft landing surface 2 made in accordance with this invention.

The landing surface 2 denotes a defined area on which the final phase of the operation for approach of the aircraft or the landing is completed and from which the take-off manoeuvre of an aircraft starts.

In its embodiment illustrated in FIG. 1, the surface 2 has a first symbol R1 representing a circle and a second symbol R2 representing a capital letter H, which is the first letter of the word Helicopter.

Each of the symbols R1 and R2 is at least partly formed by the arrangement in an orderly sequence of a plurality of lighting elements 3.

The lighting elements 3 are of the electrical type.

As shown in FIG. 2, the lighting elements 3 are connected to one another by intermediate portions 4 of an electrical conductor cable 5.

The sequence of lighting elements 3 and intermediate portions 4 of cable form a chain 6.

FIG. 2 shows a chain 6 comprises six lighting elements 3.

At a relative end 6a the chain 6 has a final portion 5f of electrical conductor cable 5 which is designed to be connected to the electricity network.

Again with reference to FIG. 1, the system 1 has a plurality of branch boxes 7 for accessing the electricity network.

The electricity branch boxes 7 are made in the form of manholes, that is, cavities leading out of the landing surface 2, or also in the form of actual boxes projecting completely or partly from the surface 2.

In other words, advantageously, the connections of the lighting system 1 to the electricity network are made in such a way as to not cause any obstruction on the landing surface 2.

Figure 5:
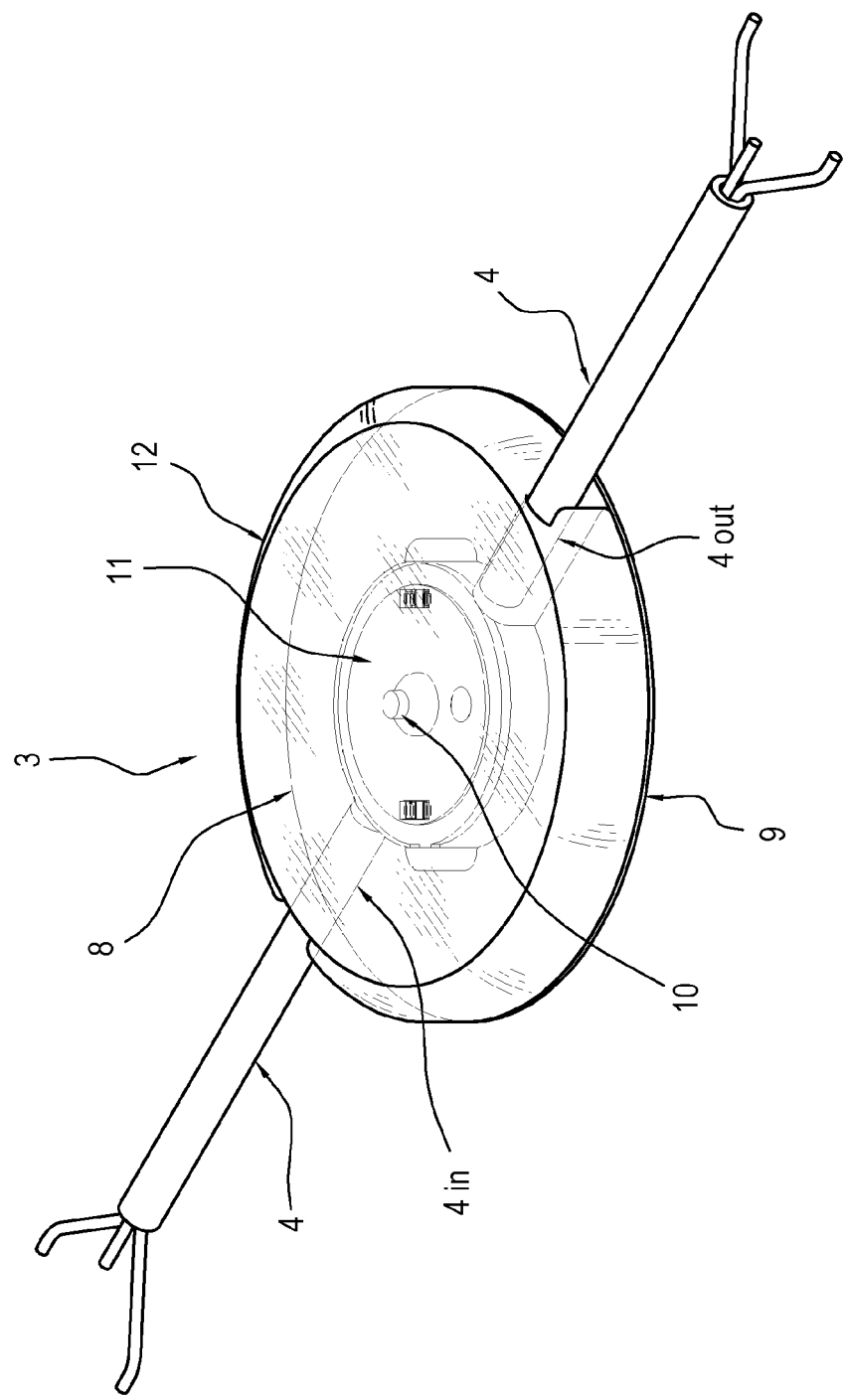
FIG. 5 is an enlarged perspective view from above of a portion of the detail of FIG. 2.

As illustrated in FIG. 5, each lighting element 3 comprises a respective sealed casing 8, in which the ends 4in, 4out of the intermediate portions 4 of cable 5 which connect to the lighting element 3 are contained.

In the case of lighting element 3 set in an end position in the respective chain 6, there will clearly be a single end 4in connected to the element 3, as clearly shown in FIG. 2.

Again with reference to FIG. 5, the lighting element 3 comprises a base 9 designed to engage by resting on the surface 2 and a light emitting unit 10, such as a LED.

The lighting element 3 also comprises electronic check and control means 11 for the light emitting unit 10 and a transparent cover 12.

The light emitting unit 10 and the electronic means 11 are enclosed between the base 9 and the transparent cover 12.

Advantageously, the transparent cover 12 is connected to the base by gluing and/or by inserting a resin which surrounds the emitting unit 10, the electronic means 11 and the ends 4in, 4out of the intermediate portions 4 of cable, sealing everything and connecting it stably to the base 9.

The base 9 is advantageously made of thermoplastic material, for example using Mylar®, which is compatible with the resin of the transparent cover 12 and at the same time has a high resistance to corrosion in the contact with the metal with which the surface 2 is normally made.

With reference to FIGS. 3 and 4, the system 1 comprises a guard 13 covering a predetermined number of lighting elements 3.

The guard 13 has a substantially rectangular shape and a main axis of extension A.

The guard 13 has a plurality of openings 14 arranged one after another along the above-mentioned axis A and each designed to superpose, in use, a respective lighting element 3, as shown in FIG. 4, to allow the passage and the diffusion of the light which they emit.

Holes 15 are made on an upper face 13a of the guard 13 for housing means 16 for fixing to the underlying surface 2, preferably of the screw type, as illustrated in FIG. 4.

By fixing the guard 13 to the surface 2 by using the above-mentioned fixing means 16, the underlying lighting elements 3 are also stably positioned on the surface 2.

The guard 13 is removably connected to the surface 2 by the above-mentioned fixing means 16.

In other words, the fixing means 16 are of the removable type, so as to allow the removal of the guard 13 to perform maintenance of the underlying chain 6.

As illustrated in FIGS. 3 and 4, the covering guard 13 has a perimetric rectangular edge 17 along which is formed a plurality of slots 18 designed for the passage of intermediate portions 4 of electrical conductor cable 5.

Advantageously, the slots 18 are made both on the short sides 17a of the rectangular edge 17 the guard 13 and on the long sides 17b of the same rectangular edge 17, in the proximity of both its opposite longitudinal ends.

The slots 18 made at the longitudinal ends of the long sides 17b are designed to allow the passage of the cable between two groups of lighting elements 3 positioned at 90° to each other.

The above-mentioned slots 18 made along the rectangular perimetric edge 17 are also advantageously designed to allow the flow of water from one side of the guard 13 to the other.

More specifically, with reference to the circle R1 of FIG. 1, the presence of the slots 18 has the purpose of preventing the accumulation of water inside circle; an accumulation of water could, in effect, make the maneuvers for landing on the surface 2 difficult. Usefully, the slots 18 facilitate the passage of the water also away from the second symbol R2 consisting of the capital letter H.

In use, with reference to FIG. 1, the landing surface 2 has, as mentioned, two symbols represented by a circle, labelled R1, and a capital letter H, labelled R2.

In order to make both the symbols visible even under poor lighting conditions, the system 1 comprises a plurality of lighting elements 3 distributed on the symbols R1, R2.

More specifically, the first symbol consisting of the circle R1 is made in four distinct sections T1, T2, T3, T4, each defined by a respective chain 6.

Each chain 6 draws the necessary electricity supply from a respective box 7 connected to the electricity network.

In the preferred, non-limiting embodiment illustrated in the accompanying drawings, the system 1 comprises chains 6 consisting of units 19 formed by six lighting elements 3.

Since some regulations require that the symbol of the circle R1 is made with a broken line, the groups 19 of lighting elements 3 are spaced apart from each other in order to visually reproduce a broken line.

Alternatively, in the case of the symbol R2 of the letter H, for which the regulations require a continuous line, a plurality of luminous chains 6 is combined with a plurality of guards 13, with the guards 13 being positioned side by side without clear spacing between one and another, to make the continuity of the line visually perceivable.

With reference to FIG. 1, the second symbol R2 comprising the letter H is also made in four distinct sections T5, T6, T7, T8 each defined by a respective chain 6 completed by a plurality of guards 13 to cover the entire symbol R2.

Similarly to what is described above for the circle R1, each chain 6 of the second symbol R2 draws the necessary electricity supply from a respective branch box 7 connected to the electricity network.

Moreover, in order to make the letter H of the second symbol R2 with a continuous line, two adjacent groups of lighting elements 3 are arranged at 90°. This arrangement is made advantageously possible by the presence of the above-mentioned slots 18 which allow the passage of the cable also placing two guards 13 side by side, one on its short side 17a and the other at its long side 17b.

According to alternative embodiments of the invention, not illustrated, the system 1 comprises a plurality of groups 19 each of which is associated with a respective branch box 7; this configuration, even though it is more complex from the point of view of making many junction boxes on the surface 2, has the evident advantage of avoiding the presence on the surface of pieces of connection cable 5 of adjacent groups 19. This solution is therefore preferable if one wishes to totally eliminate the presence of cables 5 visible on the landing surface 2.

This invention also relates to a method for making a lighting system 1 for aircraft landing surfaces 2.

The method according to this invention comprises the step of preparing a chain 6 of lighting elements which are connected to one another by intermediate portions 4 of an electrical conductor cable 5 and comprising at least at one end 6a a respective final portion 5f of cable, as well as the step of positioning the chain 6 on the surface 2 to help to form a predetermined symbol R1, R2 which is visible by the aircraft during landing.

The method according to this invention also comprises the step of connecting the above-mentioned final portion 5f of cable 5 to the electricity network at a respective branch box 7 for accessing the electricity network.

Preferably, the above-mentioned method also comprises the step of positioning covering guards 13 on respective groups 3 of lighting elements 19 and fixing the guards 13 to the surface 2 with respective fixing means 16.

Moreover, the step of placing the guards 13 on the groups 19 of lighting elements 3 comprises the step of placing the intermediate portions 4 (or final portions 5f in the case of the first lighting element 3 of a chain) of cable 5 delimiting each group, at respective slots 18 made on the guards 13.

This minimises the overall height of the system 1.

Advantageously, according to preferred embodiments of the invention, in order to optimise the reliability of the system 1, the lighting elements 3 are supplied alternatively by two independent circuits, not illustrated. In other words, an electrical conductor supplies one in every two lighting elements 3. When the conductor does not supply the element 3, the conductor does not undergo electrical interruptions inside the casing 8 of that lighting element 3 but continues for supplying the next lighting element 3.

The invention achieves the proposed aims and brings important advantages.

Since the chain 6 consists of a set of lighting elements 3 individually sealed which enclose the electrical conductor cable 5 (which also mechanically connects the lighting elements 3 to each other), the chain 6 does not have interruptions in the branch electricity box 7, advantageously of the sealed type and explosion-resistant.

The absence of interruptions, such as, for example, connections, in the cable 5, radically reduces the risk of explosions since it eliminates the possibility of generating sparks, and explosion-resistant connectors are not required. This also eliminates the need for intermediate electrical connections which, in the reference applications, protrude on the installation surface and therefore create obstructions for the light emitted and for the operations which are performed.

The chain 6 is also advantageously made of sections of predetermined length, and can then be shortened according to the specific needs, by combining the resulting chain 6 with a suitable number of guards 13.

The fact that the cable 5 is partly integrated in the casings 8 of the lighting elements 3 and partly contained inside the guards 13 minimises the overall dimensions of the lighting system 1 according to this invention.

Thanks to the fact that the chain 6 provides an electrical continuity (that is, the fact that the lighting elements 3 which make up the chain cannot be separated) and the guards 13 have a simultaneous mechanical discontinuity (that is, the fact that the guards 13 which cover a chain 6 are disconnected and separate from each other), the system 1 according to this invention guarantees a high versatility since the chain 6 may be positioned on site to form a predetermined symbol, and the guards 13 also fixed, only on site, to guarantee that the predetermined position is maintained.

Moreover, in the case of breakage of one or more lighting elements 3, the fact that the guards 13 are separate from the chain 6 usefully allows the single chain 6 to be replaced, also maintaining the guards 13.

In effect, since the above-mentioned electrical continuity of the chain 6 results in the fact that, in the case of breakage of even a single lighting element 3, it is necessary to replace the entire chain 6 in order to restore the total functionality, at least the guards 13 which protect them, may be reused, thus reducing the cost related to these repair works.

For example, in the event of a fault to a chain 6 in a system 1 according to this invention, in order to allow its repair a technician need only know the length of the chain and, having a new chain 6 with a length greater than or equal to that of the faulty one, the system can be repaired.

This possibility appears absolutely advantageous relative to the prior art solutions, wherein the lighting elements are irremovably connected to the protective devices, and consequently the replacement of the one implies the replacement of the other, with obvious increases both in terms of costs and practical complications.

With these prior art solutions (see, for example, the one illustrated in EP 648 898) a fault of a lighting element implies the replacement of a group of electroluminescent sources which are assembled together inside a base element, having a predetermined shape and size. The repairing of the fault therefore presupposes the preparing of a new base element exactly of this shape and size.

As mentioned above, advantageously, with the adoption of a system according to this invention it is sufficient to have a chain 6 with a length greater than or equal to the one to be replaced.

The system 1 according to this invention is also simple to install as it requires only the connection of each chain 6 to an electrical branch box 7; all the lighting elements 3 of the chain being already connected to each other.

The invention claimed is:

1. A lighting system for an aircraft landing surface, comprising:
a plurality of electric lighting elements each having a separate base for engaging a top surface of the aircraft landing surface, the plurality of electric lighting elements arranged in a sequence for forming a portion of a predetermined symbol, visible from an aircraft during landing,
at least one branch box for accessing an electricity network,
a plurality of intermediate portions of an electrical conductor cable connecting the plurality of electric lighting elements to one another, a sequence of the lighting elements and the intermediate portions forming a chain, the chain comprising at one end a respective final portion of cable, the final portion being connected to the electricity network via the at least one branch box,
at least one covering guard having a main axis of extension and a plurality of openings corresponding to a predetermined number of electric lighting elements, wherein each of the separate bases includes a clamping portion having a lateral dimension greater than a lateral dimension of a corresponding one of the plurality of openings to create an overlapping engagement, wherein the predetermined number of electric lighting elements are interposed between the top surface of the aircraft landing surface and the at least one covering guard, such that when the plurality of openings are superposed over the predetermined number of the electric lighting elements to allow passage of light emitted from the predetermined number of the electric lighting elements through the at least one covering guard, the predetermined number of electric lighting elements are clamped between the top surface of the aircraft landing surface and the at least one covering guard by the overlapping engagement;

at least one removable fastener for fixing the at least one covering guard to the aircraft landing surface to clamp the predetermined number of electric lighting elements between the top surface of the aircraft landing surface and the at least one covering guard;

the at least one covering guard including a bottom surface extending laterally outward beyond a perimeter of the separate bases of the plurality of electric lighting elements such that a portion of the bottom surface is open to the top surface of the aircraft landing surface when the at least one covering guard is clamping the predetermined number of electric lighting elements to the top surface of the aircraft landing surface.

2. The system according to claim 1, wherein each electric lighting element further comprises a light emitting unit and a transparent cover, the light emitting unit being enclosed between the base and the transparent cover.

3. The system according to claim 1, wherein each of the electric lighting elements comprises a sealed casing, inside which ends of the intermediate portions of cable are connected to the each of the electric lighting elements.

4. The system according to claim 3, and further comprising a resin in which the ends of the intermediate portions of cable connected to each of the electric lighting elements are embedded.

5. The system according to claim 1, wherein each electric lighting element further comprises: a light emitting unit, an electronic controller for said light emitting unit and a transparent cover, the light emitting unit and the electronic controller being enclosed between the base and the transparent cover.

6. The system according to claim 1, wherein the at least one covering guard comprises a perimetric edge including a plurality of slots allowing for passage of the intermediate portions of cable.

7. The system according to claim 1, wherein the at least one covering guard comprises a perimetric edge including a plurality of slots allowing water to pass from a first side of the at least one covering guard to a second side of the at least one covering guard.

8. The system according to claim 1, wherein the predetermined number of electric lighting elements covered by the at least one covering guard forms a group, and further comprising, for each group of electric lighting elements, a respective one of the at least one branch box for accessing the electricity network.

9. The system according to claim 1, wherein the plurality of electric lighting elements are connected to one another only by the plurality of intermediate portions.

10. A method for making a lighting system for aircraft landing surfaces, comprising:

providing a plurality of electric lighting elements each having a separate base for engaging a top surface of the aircraft landing surface, the plurality of electric lighting elements arranged in a sequence for forming a portion of a predetermined symbol, visible from an aircraft during landing, providing at least one branch box for accessing an electricity network, providing a plurality of intermediate portions of an electrical conductor cable connecting the plurality of electric lighting elements to one another, providing at least one covering guard having a main axis of extension and a plurality of openings corresponding to a predetermined number of electric lighting elements, such that when the openings are superposed over the predetermined number of the electric lighting elements, they allow passage of light emitted from the predetermined number of the electric lighting elements through the at least one covering guard, providing that each of the separate bases includes a clamping portion having a lateral dimension greater than a lateral dimension of a corresponding one of the plurality of openings to create an overlapping engagement, preparing a chain made up of a plurality of electric lighting elements connected to one another by intermediate portions of a cable and comprising at least at one end a respective final portion of cable, positioning the chain on the top surface of the aircraft landing surface to form the portion of the predetermined symbol on the top surface of the aircraft landing surface, connecting said final portion to the electricity network at the at least one branch box for accessing the electricity network, placing, on groups of said lighting elements, the at least one covering guard such that the predetermined number of electric lighting elements are interposed between the top surface of the aircraft landing surface and the at least one covering guard and the plurality of openings are superposed over the predetermined number of the electric lighting elements, fixing the at least one covering guard to the aircraft landing surface with a removable fastener such that the predetermined number of electric lighting elements are clamped between the top surface of the aircraft landing surface and the at least one covering guard by the overlapping arrangement, providing that the at least one covering guard includes a bottom surface extending laterally outward beyond a perimeter of the separate bases of the plurality of electric lighting elements such that a portion of the bottom surface is open to the top surface of the aircraft landing surface when the at least one covering guard is clamping the predetermined number of electric lighting elements to the top surface of the aircraft landing surface.

11. The method according to claim 10, wherein said step of placing the at least one covering guard on the groups of electric lighting elements comprises the intermediate portions delimiting each group at respective slots made in the at least one covering guard.

12. The method according to claim 10, and further comprising preparing for each group of electric lighting elements a respective one of the at least one branch box for accessing the electricity network.

13. The method according to claim 10, wherein the plurality of electric lighting elements are connected to one another only by the plurality of intermediate portions.

* * * * *